(12) United States Patent
Sarkar et al.

(10) Patent No.: US 8,320,279 B2
(45) Date of Patent: *Nov. 27, 2012

(54) MANAGING AND PROVISIONING VIRTUAL ROUTERS

(75) Inventors: Manojit Sarkar, Fremont, CA (US); Dileep Kumar, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/022,696

(22) Filed: Feb. 8, 2011

(65) Prior Publication Data

US 2011/0128891 A1 Jun. 2, 2011

Related U.S. Application Data

(60) Continuation of application No. 12/637,140, filed on Dec. 14, 2009, now Pat. No. 7,885,207, which is a continuation of application No. 11/616,243, filed on Dec. 26, 2006, now Pat. No. 7,639,632, which is a division of application No. 09/663,485, filed on Sep. 13, 2000, now Pat. No. 7,272,643.

(51) Int. Cl.
*H04L 12/28* (2006.01)

(52) U.S. Cl. ........ 370/254; 370/255; 370/389; 709/221; 709/222

(58) Field of Classification Search .................. 370/389, 370/396, 254, 255; 709/221, 222
See application file for complete search history.

(56) References Cited

U.S. PATENT DOCUMENTS

| | | | |
|---|---|---|---|
| 4,667,287 A | 5/1987 | Allen et al. | |
| 4,667,323 A | 5/1987 | Engdahl et al. | |
| 4,726,018 A | 2/1988 | Bux et al. | |
| 5,483,525 A | 1/1996 | Song et al. | |
| 5,490,252 A | 2/1996 | Macera et al. | |
| 5,491,691 A | 2/1996 | Shtayer et al. | |
| 5,550,816 A | 8/1996 | Hardwick et al. | |
| 5,581,705 A | 12/1996 | Passint et al. | |
| 5,598,414 A | 1/1997 | Walser et al. | |
| 5,633,866 A | 5/1997 | Callon | |
| 5,745,778 A | 4/1998 | Alfieri | |
| 5,825,772 A | 10/1998 | Dobbins et al. | |
| 5,825,891 A | 10/1998 | Levesque et al. | |
| 5,841,973 A | 11/1998 | Kessler et al. | |
| 5,841,990 A | 11/1998 | Picazo et al. | |

(Continued)

OTHER PUBLICATIONS

Non-Final Rejection for U.S. Appl. No. 12/328,858, mailed Dec. 6, 2011.

(Continued)

*Primary Examiner* — Dang Ton
*Assistant Examiner* — Mandish Randhawa
(74) *Attorney, Agent, or Firm* — Hamilton, DeSanctis & Cha LLP

(57) ABSTRACT

Methods and systems are provided for provisioning and managing network-based virtual private networks (VPNs). According to one embodiment, a routing configuration for each of multiple network-based customer VPNs is generated for multiple customers based on (i) site reachability information for multiple service processing switches and (ii) a global customer routing profile for a network-based customer VPN of the plurality of network-based customer VPNs. Multiple virtual routers (VRs) distributed among the service processing switches are provisioned to support the network-based customer VPNs based on the routing configurations. A custom routing profile, identifying one or more routing protocols to be used for one or more segments of the network-based customer VPN profile, is received for the network-based customer VPN. The network-based customer VPN is automatically reconfigured by programmatically generating appropriate routing configurations for VRs partitioned to the network-based customer VPN based on the site reachability information and the custom routing profile.

30 Claims, 6 Drawing Sheets

U.S. PATENT DOCUMENTS

| | | |
|---|---|---|
| 5,875,290 A | 2/1999 | Bartfai et al. |
| 5,892,924 A | 4/1999 | Lyon et al. |
| 5,920,705 A | 7/1999 | Lyon et al. |
| 5,963,555 A | 10/1999 | Takase et al. |
| 5,964,847 A | 10/1999 | Booth et al. |
| 5,987,521 A | 11/1999 | Arrowood et al. |
| 6,032,193 A | 2/2000 | Sullivan |
| 6,047,330 A | 4/2000 | Stracke |
| 6,069,895 A | 5/2000 | Ayandeh |
| 6,094,674 A | 7/2000 | Hattori et al. |
| 6,098,110 A | 8/2000 | Witkowski et al. |
| 6,118,791 A | 9/2000 | Fichou et al. |
| 6,134,226 A | 10/2000 | Reed et al. |
| 6,137,777 A | 10/2000 | Vaid et al. |
| 6,169,739 B1 | 1/2001 | Isoyama |
| 6,173,399 B1 | 1/2001 | Gilbrech |
| 6,175,867 B1 | 1/2001 | Taghadoss |
| 6,192,051 B1 | 2/2001 | Lipman et al. |
| 6,212,556 B1 | 4/2001 | Arunachalam |
| 6,220,768 B1 | 4/2001 | Barroux |
| 6,226,788 B1 | 5/2001 | Schoening et al. |
| 6,243,580 B1 | 6/2001 | Garner |
| 6,246,682 B1 | 6/2001 | Roy et al. |
| 6,249,519 B1 | 6/2001 | Rangachar |
| 6,256,295 B1 | 7/2001 | Callon |
| 6,260,072 B1 | 7/2001 | Rodriguez |
| 6,260,073 B1 | 7/2001 | Walker et al. |
| 6,266,695 B1 | 7/2001 | Huang et al. |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,317,748 B1 | 11/2001 | Menzies et al. |
| 6,324,583 B1 | 11/2001 | Stevens |
| 6,330,602 B1 | 12/2001 | Law et al. |
| 6,338,092 B1 | 1/2002 | Chao et al. |
| 6,339,782 B1 | 1/2002 | Gerard et al. |
| 6,434,619 B1 | 8/2002 | Lim et al. |
| 6,449,650 B1 | 9/2002 | Westfall et al. |
| 6,453,406 B1 | 9/2002 | Sarnikowski et al. |
| 6,459,682 B1 | 10/2002 | Ellesson et al. |
| 6,463,061 B1 | 10/2002 | Rekhter et al. |
| 6,466,976 B1 | 10/2002 | Alles et al. |
| 6,487,666 B1 | 11/2002 | Shanklin |
| 6,496,935 B1 | 12/2002 | Fink et al. |
| 6,526,056 B1 | 2/2003 | Rekhter et al. |
| 6,532,088 B1 | 3/2003 | Dantu et al. |
| 6,542,466 B1 | 4/2003 | Pashtan et al. |
| 6,542,502 B1 | 4/2003 | Herring et al. |
| 6,542,515 B1 | 4/2003 | Kumar et al. |
| 6,553,423 B1 | 4/2003 | Chen |
| 6,556,544 B1 | 4/2003 | Lee |
| 6,608,816 B1 | 8/2003 | Nichols |
| 6,611,498 B1 | 8/2003 | Baker et al. |
| 6,611,522 B1 | 8/2003 | Zheng et al. |
| 6,614,781 B1 | 9/2003 | Elliott et al. |
| 6,625,169 B1 | 9/2003 | Tofano |
| 6,625,650 B2 | 9/2003 | Stelliga |
| 6,629,128 B1 | 9/2003 | Glass |
| 6,631,519 B1 | 10/2003 | Nicholson et al. |
| 6,636,516 B1 | 10/2003 | Yamano |
| 6,639,897 B1 | 10/2003 | Shiomoto et al. |
| 6,640,248 B1 | 10/2003 | Jorgensen |
| 6,658,013 B1 | 12/2003 | de Boer et al. |
| 6,668,282 B1 | 12/2003 | Booth et al. |
| 6,680,922 B1 | 1/2004 | Jorgensen |
| 6,694,437 B1 | 2/2004 | Pao et al. |
| 6,697,359 B1 | 2/2004 | George |
| 6,697,360 B1 | 2/2004 | Gai et al. |
| 6,701,449 B1 | 3/2004 | Davis et al. |
| 6,738,371 B1 | 5/2004 | Ayres |
| 6,738,821 B1 | 5/2004 | Wilson et al. |
| 6,763,236 B2 | 7/2004 | Siren |
| 6,775,267 B1 | 8/2004 | Kung et al. |
| 6,775,284 B1 | 8/2004 | Calvignac et al. |
| 6,778,502 B2 | 8/2004 | Ricciulli |
| 6,785,224 B2 | 8/2004 | Uematsu et al. |
| 6,785,691 B1 | 8/2004 | Hewett et al. |
| 6,802,068 B1 | 10/2004 | Guruprasad |
| 6,807,181 B1 | 10/2004 | Weschler |
| 6,816,462 B1 | 11/2004 | Booth et al. |
| 6,820,210 B1 | 11/2004 | Daruwalla et al. |
| 6,822,958 B1 | 11/2004 | Branth et al. |
| 6,856,676 B1 | 2/2005 | Pirot et al. |
| 6,868,082 B1 | 3/2005 | Allen et al. |
| 6,894,994 B1 | 5/2005 | Grob et al. |
| 6,907,039 B2 | 6/2005 | Shen |
| 6,920,146 B1 | 7/2005 | Johnson et al. |
| 6,920,580 B1 | 7/2005 | Cramer et al. |
| 6,922,774 B2 | 7/2005 | Meushaw et al. |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton et al. |
| 6,959,194 B2 | 10/2005 | Brouwer et al. |
| 6,980,526 B2 | 12/2005 | Jang et al. |
| 6,985,438 B1 | 1/2006 | Tschudin |
| 6,985,956 B2 | 1/2006 | Luke et al. |
| 6,990,103 B1 | 1/2006 | Gollamudi |
| 7,020,143 B2 | 3/2006 | Zdan |
| 7,042,848 B2 | 5/2006 | Santiago et al. |
| 7,054,311 B2 | 5/2006 | Norman et al. |
| 7,068,656 B2 | 6/2006 | Sainomoto et al. |
| 7,082,477 B1 | 7/2006 | Sadhasivam et al. |
| 7,089,293 B2 | 8/2006 | Grosner et al. |
| 7,096,383 B2 | 8/2006 | Talaugon et al. |
| 7,096,495 B1 | 8/2006 | Warrier et al. |
| 7,159,035 B2 | 1/2007 | Garcia-Luna-Aceves et al. |
| 7,161,904 B2 | 1/2007 | Hussain et al. |
| 7,187,676 B2 | 3/2007 | DiMambro |
| 7,197,553 B2 | 3/2007 | Roberts et al. |
| 7,221,945 B2 | 5/2007 | Milford |
| 7,225,259 B2 | 5/2007 | Ho et al. |
| 7,243,371 B1 | 7/2007 | Kasper et al. |
| 7,266,120 B2 | 9/2007 | Cheng et al. |
| 7,272,643 B1 | 9/2007 | Sarkar et al. |
| 7,278,055 B2 | 10/2007 | Talaugon et al. |
| 7,293,355 B2 | 11/2007 | Lauffer et al. |
| 7,313,614 B2 | 12/2007 | Considine et al. |
| 7,316,029 B1 | 1/2008 | Parker et al. |
| 7,324,489 B1 | 1/2008 | Iyer |
| 7,324,889 B1 | 1/2008 | Arai et al. |
| 7,587,633 B2 | 9/2009 | Talaugon et al. |
| 7,639,632 B2 | 12/2009 | Sarkar et al. |
| 7,720,053 B2 | 5/2010 | Hussain |
| 7,761,743 B2 | 7/2010 | Talaugon |
| 7,830,787 B1 | 11/2010 | Wijnands et al. |
| 7,843,813 B2 | 11/2010 | Balay |
| 7,869,361 B2 | 1/2011 | Balay |
| 7,876,683 B2 | 1/2011 | Balay |
| 7,881,244 B2 | 2/2011 | Balay |
| 7,885,207 B2 | 2/2011 | Sarkar |
| 7,925,920 B2 | 4/2011 | Talaugon |
| 7,933,269 B2 | 4/2011 | Cheng |
| 7,957,407 B2 | 6/2011 | Desai |
| 7,961,615 B2 | 6/2011 | Balay |
| 8,068,503 B2 | 11/2011 | Desai et al. |
| 8,107,376 B2 | 1/2012 | Balay et al. |
| 8,208,409 B2 | 6/2012 | Millet |
| 8,213,347 B2 | 7/2012 | Balay et al. |
| 2001/0024425 A1 | 9/2001 | Tsunoda et al. |
| 2001/0028636 A1 | 10/2001 | Skog et al. |
| 2001/0033580 A1 | 10/2001 | Dorsey et al. |
| 2001/0034733 A1 | 10/2001 | Prompt et al. |
| 2001/0043571 A1 | 11/2001 | Jang et al. |
| 2001/0052013 A1 | 12/2001 | Munguia et al. |
| 2002/0023171 A1 | 2/2002 | Garrett et al. |
| 2002/0062344 A1 | 5/2002 | Ylonen et al. |
| 2002/0071389 A1 | 6/2002 | Seo |
| 2002/0075901 A1 | 6/2002 | Perlmutter et al. |
| 2002/0097730 A1 | 7/2002 | Langille et al. |
| 2002/0099849 A1 | 7/2002 | Alfieri et al. |
| 2002/0150093 A1 | 10/2002 | Ott et al. |
| 2002/0150114 A1 | 10/2002 | Sainomoto et al. |
| 2002/0152373 A1 | 10/2002 | Sun et al. |
| 2002/0186661 A1 | 12/2002 | Santiago et al. |
| 2003/0012209 A1 | 1/2003 | Abdelilah et al. |

| | | | |
|---|---|---|---|
| 2003/0026262 A1 | 2/2003 | Jarl | |
| 2003/0033401 A1 | 2/2003 | Poisson et al. | |
| 2003/0063590 A1 | 4/2003 | Mohan et al. | |
| 2003/0108041 A1 | 6/2003 | Aysan et al. | |
| 2003/0115308 A1 | 6/2003 | Best et al. | |
| 2003/0117954 A1 | 6/2003 | De Neve et al. | |
| 2003/0169747 A1 | 9/2003 | Wang | |
| 2003/0200295 A1 | 10/2003 | Roberts et al. | |
| 2003/0212735 A1 | 11/2003 | Hicok et al. | |
| 2003/0223406 A1 | 12/2003 | Balay | |
| 2004/0037279 A1 | 2/2004 | Zelig et al. | |
| 2004/0095932 A1 | 5/2004 | Astarabadi et al. | |
| 2004/0141521 A1 | 7/2004 | George | |
| 2004/0160900 A1 | 8/2004 | Lund et al. | |
| 2004/0199567 A1 | 10/2004 | Lund | |
| 2004/0199568 A1 | 10/2004 | Lund | |
| 2004/0199569 A1 | 10/2004 | Kalkunte et al. | |
| 2005/0002417 A1 | 1/2005 | Kelly et al. | |
| 2005/0055306 A1 | 3/2005 | Miller et al. | |
| 2005/0081059 A1 | 4/2005 | Bandini et al. | |
| 2005/0108340 A1 | 5/2005 | Gleeson et al. | |
| 2005/0113114 A1 | 5/2005 | Asthana | |
| 2005/0147095 A1 | 7/2005 | Guerrero et al. | |
| 2005/0163115 A1 | 7/2005 | Dontu et al. | |
| 2005/0213589 A1 | 9/2005 | Shih | |
| 2006/0087969 A1 | 4/2006 | Santiago et al. | |
| 2006/0206713 A1 | 9/2006 | Hickman et al. | |
| 2009/0131020 A1 | 5/2009 | van de Groenendaal | |
| 2009/0279567 A1 | 11/2009 | Ta et al. | |
| 2010/0142527 A1 | 6/2010 | Balay et al. | |
| 2010/0146098 A1 | 6/2010 | Ishizakl | |
| 2010/0146627 A1 | 6/2010 | Lin | |
| 2010/0189016 A1 | 7/2010 | Millet | |
| 2010/0220732 A1 | 9/2010 | Hussain et al. | |
| 2010/0220741 A1 | 9/2010 | Desai et al. | |
| 2011/0122872 A1 | 5/2011 | Balay | |
| 2011/0128891 A1 | 6/2011 | Sarkar | |
| 2011/0235548 A1 | 9/2011 | Balay | |
| 2011/0235649 A1 | 9/2011 | Desai | |
| 2012/0057460 A1 | 3/2012 | Hussain | |
| 2012/0069850 A1 | 3/2012 | Desai | |
| 2012/0072568 A1 | 3/2012 | Matthews | |
| 2012/0099596 A1 | 4/2012 | Balay | |
| 2012/0131215 A1 | 5/2012 | Balay et al. | |

OTHER PUBLICATIONS

Chan, Mun C. et al., "An architecture for broadband virtual networks under customer control." IEEE Network Operations and Management Symposium. Apr. 1996. pp. 135-144.
Chan, Mun C. et al "Customer Management and Control of Broadband VPN Services." Proc. Fifth IFIP/IEEE International Symposium of Integrated Network Management. May 1997. pp. 301-314.
Gasparro, D.M., "Next-Gen VPNs: The Design Challenge." Data Communications. Sep. 1999. pp. 83-95.
Hanaki, M. et al., "LAN/WAN management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.
Rao, J.R., Intranets and VPNs: Strategic Approach. 1988 Annual Review of Communications. 1998. pp. 669-674.
Tanenbaum, A.S., "Computer Networks." Upper Saddle River, N.J.: Prentice Hall PTR, 3rd Edition. 1996. pp. 348-364.
European Search Report for PCT/US03/37009 (Jul. 4, 2004) 2 pgs.
International Search Report for PCTUS03/17674. 6 pgs.
Office Action dated Nov. 28, 2007 for U.S. Appl. No. 09/952,520.
Office Action dated Oct. 16, 2007 for U.S. Appl. No. 09/661,130.
Office Action dated Oct. 18, 2007 for U.S. Appl. No. 09/663,483.
IEEE Potentials Publication; "Local Area Networks" Dec. 95/Jan. 96; pp. 6. http://www.ece.uc.edu/-paw/potentials/sample.
Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
Non-Final Office Action for U.S. Appl. No. 11/849,352 mailed Jul. 17, 2009.
Non-Final Office Action for U.S. Appl. No. 10/991,970 mailed May 18, 2009.
Non-Final Office Action for U.S. Appl. No. 10/991,969 mailed Apr. 27, 2009.
Non-Final Office Action for U.S. Appl. No. 11/684,614 mailed Apr. 24, 2009.
Non-Final Rejection for U.S. Appl. No. 12/762,362 mailed Feb. 2, 2012.
Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.
Amendment and Response filed on Mar. 13, 2006 for U.S. Appl. No. 09/663,483.
Advisory Action dated Nov. 12, 2004 for U.S. Appl. No. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.

Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr. 6, 2005 for U.S. Appl. No. 09/663,484.
Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 091771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 05, 2007 for U.S. Appl. No. 11/466,098.
Amendment and Response filed on Aug. 10, 2007 for U.S. Appl. No. 10/163,260.
IEEE Potentials Publication; "Local Area Networks" Dec. 95/Jan. 96; pp. 6. http:/www.ece.uc.edu/-paw/potentials/sample.
A lightweight Protocol for Interconnection Heterogenous Devices in Dynamic Environments, (c) 1999, obtained from the Internet at : http//ieeexplore.ieee.org/iel5/6322/16898/00778477.pdf.
The Guide to Computing Literature, Jairo A.: A Framework and Lightweight Protocol for Multimedia Network Management, vol. 8, Issue 1, published 2000, ISSN: 1064-7570.
Bookfinder4u.com: High Performance Networks by Ahmed N. Tantawy, ISBN-10: 0792393716, Published 1993, Lightweight Protocols.
Ipinfusion white paper: Virtual Routing for Provide Edge Application, obtained from the Internet at: http://www.ipinfusion.com/pdf/VirtualRouting_app-note_3rev0302.pdf, pp. 1-8.
Non-Final Office Action for U.S. Appl. No. 10/991,969, dated Feb. 20, 2008.
Non-Final Office Action for U.S. Appl. No. 10/273,669, dated Feb. 20, 2008.
Non-Final Office Action for U.S. Appl. No. 10/949,943 dated Feb. 14, 2008.
Restriction Requirement for U.S. Appl. No. 11/556,697, dated Mar. 13, 2008.
Office Action dated Aug. 1, 2007 for U.S. Appl. No. 10/163,260.
Amendment and Response filed on May 23, 2007 for U.S. Appl. No. 10/163,260.
Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.
Restriction Requirement dated Mar. 22, 2004 for U.S. Appl. No. 09/663,483.
Office Action dated Sep. 11, 2007 for U.S. Appl. No. 09/661,637.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.

Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Supplemental Amendment and Response filed on Sep. 17, 2007, 2007 for U.S. Appl. No. 09/663,457.
Non-Final Rejection for U.S. Appl. No. 13/359,960, mailed Apr. 26, 2012.
Non-Final Rejection for U.S. Appl. No. 12/477,124 mailed May 23, 2011.
Notice of Allowance for U.S. Appl. No. 12/328,858 mailed May 25, 2012.
Notice of Allowance for U.S. Appl. No. 12/762,362 mailed May 22, 2012.
Non-Final Rejection for U.S. Appl. No. 12/637,140, mailed Sep. 17, 2010.
Non-Final Rejection for U.S. Appl. No. 12/537,898, mailed Sep. 9, 2010.
Final Rejection for U.S. Appl. No. 12/202,223, mailed Sep. 16, 2010.
Non-Final Rejection for U.S. Appl. No. 12/202,233 mailed Jun. 21, 2010.
Non-Final Rejection for U.S. Appl. No. 11/460,977, mailed Jul. 2, 2010.
Non-Final Rejection for U.S. Appl. No. 11/537,609 mailed Jul. 11, 2011.
Notice of Allowance for U.S. Appl. No. 13/305,743 mailed Jul. 25, 2012.
Notice of Allowance for U.S. Appl. No. 11/530,901 mailed Jul. 20, 2012.
Notice of Allowance for U.S. Appl. No. 09/952,520 mailed Jul. 6, 2012.
Notice of Allowance for U.S. Appl. No. 12/477,124 mailed Sep. 19, 2012.
Non-Final Rejection for U.S. Appl. No. 12/259,296, mailed Sep. 27, 2011.
Final Rejection for U.S. Appl. No. 112,477,124, mailed Nov. 4, 2011.
Non-Final Rejection for U.S. Appl. No. 11/530,901, mailed Nov. 9, 2011.

MANAGING AND PROVISIONING VIRTUAL ROUTERS

CROSS-REFERENCE TO RELATED APPLICATIONS

This application is a continuation of U.S. patent application Ser. No. 12/637,140, filed Dec. 14, 2009, which is a continuation of U.S. patent application Ser. No. 11/616,243, filed Dec. 26, 2006, now U.S. Pat. No. 7,639,632, which is a divisional of U.S. patent application Ser. No. 09/663,485, filed on Sep. 13, 2000, now U.S. Pat. No. 7,272,643, all of which are hereby incorporated by reference in their entirety for all purposes.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data described below and in the drawings hereto: Copyright© 2000-2009, Fortinet, Inc. All Rights Reserved.

1. Field

Embodiments of the present invention relate generally to computer network routers, and more particularly to systems and methods of managing virtual routers.

2. Background

The interest in the deployment of virtual private networks (VPNs) across IP backbone facilities is growing every-day. In general, VPNs fall into two categories: Customer Provided Equipment—(CPE) based VPNs and network-based VPNs.

With CPE-based VPNs, the ISP network provides only layer 2 connectivity to the customer. The CPE router takes ownership of setting up tunnels and handling routing with other sites. Network-based VPNs consist of a mesh of tunnels between ISP routers. They also have the routing capabilities required to forward traffic from each customer site. Each ISP router has a VPN-specific forwarding table that contains VPN member sites. The benefit offered by network-based VPNs is that the ISP is responsible for routing configuration and tunnel setup. In addition, other services, such as firewall, Quality of Service (QoS) processing, virus scanning, and intrusion detection can be handled by a small number of ISP routers. New services can be introduced and managed without the need to upgrade CPE devices.

There are typically three steps to building a VPN's infrastructure:
1) Define a topology and create tunnels using IPSec, LT2P, PPTP, GRE, or
MPLS.
2) Configure routing on the edge routers to disseminate site- and intra-VPN reachability information.
3) Enable such services as firewall, QoS, and so forth.

Usually, IP network managers use the following model for building and maintaining their networks:
1) With the help of some network experts, design the network.
2) Use the command line interface (CLI) or ASCII configuration files to define the routing configuration.
3) Use trial-and-error method to determine a working solution for the network configuration.
4) Manually manage configuration files for routers.

The process of building or changing a network requires significant manual effort, and is slow, expensive, and error-prone. For ISPs that plan to provide VPN services, this model for provisioning VPNs is problematic. ISPs need to configure routing for VPNs, each of which can be considered separate networks.

As noted above, building and managing one network is difficult, the problem is made much worse when the ISP must build and manage thousands of networks. For ISPs to succeed at this, a facilitation framework is required.

SUMMARY

Methods and systems are described for simplifying the provisioning and management of network-based virtual private networks (VPNs). According to one embodiment, a routing configuration for each of multiple network-based customer VPNs is generated for multiple customers based on (i) site reachability information for multiple service processing switches and (ii) a global customer routing profile for a network-based customer VPN of the plurality of network-based customer VPNs. Multiple virtual routers (VRs) distributed among the service processing switches are provisioned to support the network-based customer VPNs based on the routing configurations. A custom routing profile, identifying one or more routing protocols to be used for one or more segments of the network-based customer VPN profile, is received for the network-based customer VPN. The network-based customer VPN is automatically reconfigured by programmatically generating appropriate routing configurations for VRs partitioned to the network-based customer VPN based on the site reachability information and the custom routing profile.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component, which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the software environment of varying embodiments of the invention is described. In the final section, a conclusion is provided.

Hardware and Operating Environment

Figure 1:
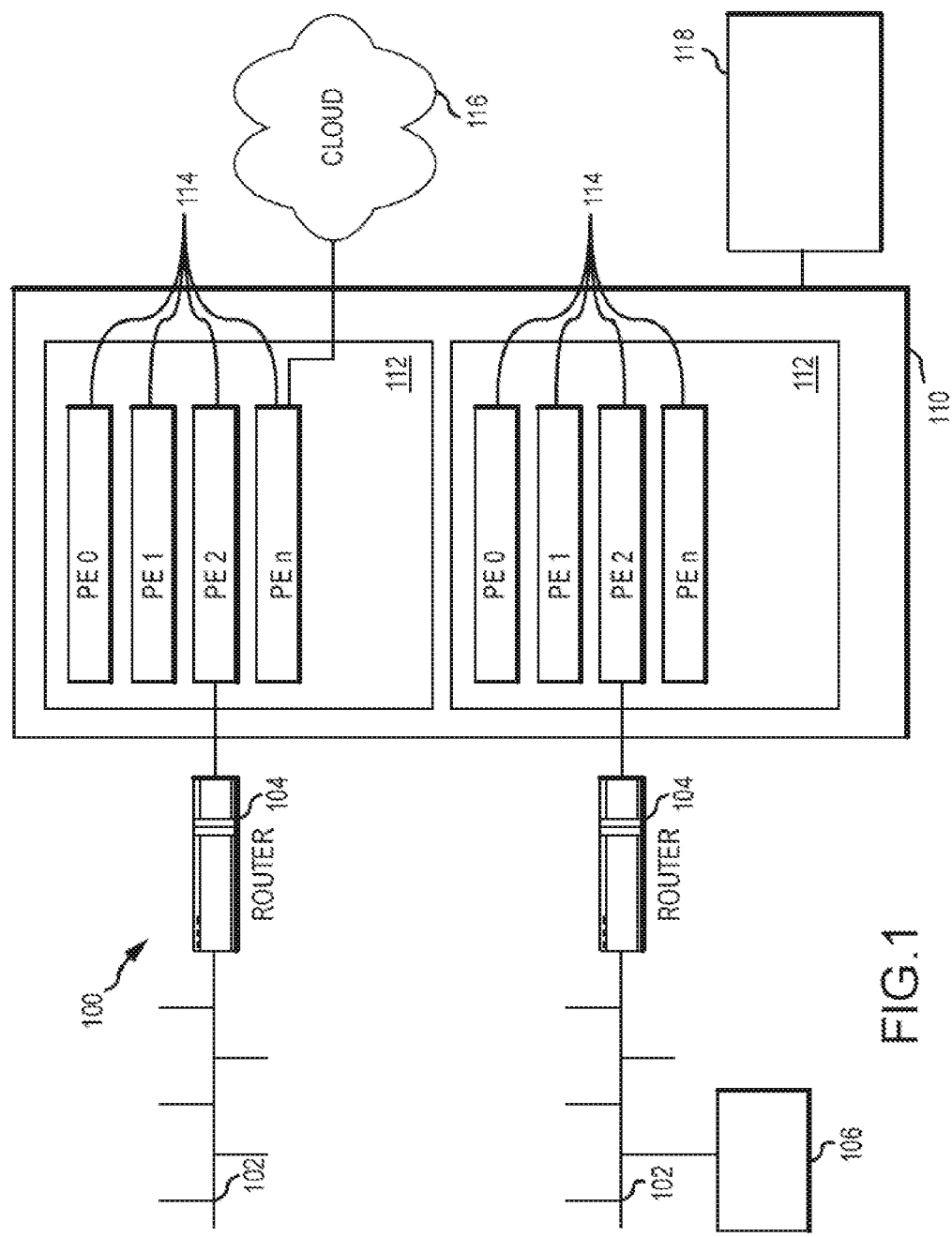
FIG. 1 is a block diagram of the hardware and operating environment in which various embodiments of the present invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, the system 100 includes a service processing switch 110, access routers 104, service management system 118, and customer network management system 106. In some embodiments, service processing switch 110 provides switching, routing and computing resources that can be allocated by a service provider to customers. In one embodiment, the service processing switch 110 is the IPSX 9000 service processing switch from CoSine Communications, Inc. However, the invention is not limited to any particular switch, router or service processing hardware.

Service processing switch can contain one or more blades 112. In some embodiments of the invention, blades 112 have a type associated with them. Examples of blade types include, processing functions such as network blades, control blades, trunk blades, and processor blades. Network blades provide interfaces to different types of networks. Control blades provide system management and accounting functions to the service processing system 110. Trunk blades provide access to high speed trunk networks. Processor blades provide general purpose computer processors that in some embodiments of the invention provide firewall, intrusion detection, or directory services. Blades are communicably coupled to one another, in one embodiment a packet ring is used to couple the blades.

In some embodiments, each of blades 112 includes one more processing elements 114. Processing elements 114 include CPU and memory that provide computing resources for the blade. The invention is not limited to any particular number of processing elements on a blade, nor is the invention limited to any particular number of blades in a service processing switch 110.

Service processing system 110 is typically communicably coupled to a network 116, for example the Internet. Network 116 can also be a Wide Area Network (WAN), a Local Area Network (LAN), or a private network.

Service processing system 110 is also typically communicably coupled to a plurality of customer networks 102 via customer access routers 104.

Service management system 118 hosts software that is used to configure and control the operation of service processing switch 110. In one embodiment of the invention, the service management system is a SPARC system available from Sun Microsystems, Inc. running the In Vision product from CoSine Communications, Inc. Service management system 118 can be used to allocate resources within service processing switch 110 to various customers. In one embodiment of the invention, service management system 118 communicates with service processing switch 110 using the Simple Network Management Protocol (SNMP). The operation of service management system 118 will be described in further detail in the sections that follow.

Customer network management system 106 hosts software that configures and controls the resources within service processing switch 110 that have been allocated to the particular customer. The operation of service management system 118 will be described in further detail in the sections that follow.

Those skilled in the art will appreciate that the invention may be practiced with other routing system hardware configurations besides those described above.

Software Environment

Embodiments of the present invention include a software environment of systems and methods that provide a mechanism for simplifying the provisioning and management of Virtual Private Networks (VPNs) and Virtual Routers (VRs) within a service processing switch. Various embodiments of the present invention provide a policy-based mechanism for network provisioning. Thus, a service provider, for example, an Internet Service Provider (ISP), managing a service processing switch can create various service policies, which are used in defining VPN profiles. These profiles are used to automatically generate tunnels, routing, and other service configurations for VPNs. Resources within switch 110 such as blades and processing elements are allocated by a service provider to one or more customers, who then can configure those elements allocated to it. Configuration from the service provider's perspective, and from the customer's perspective can be driven based on profiles.

Figure 2:
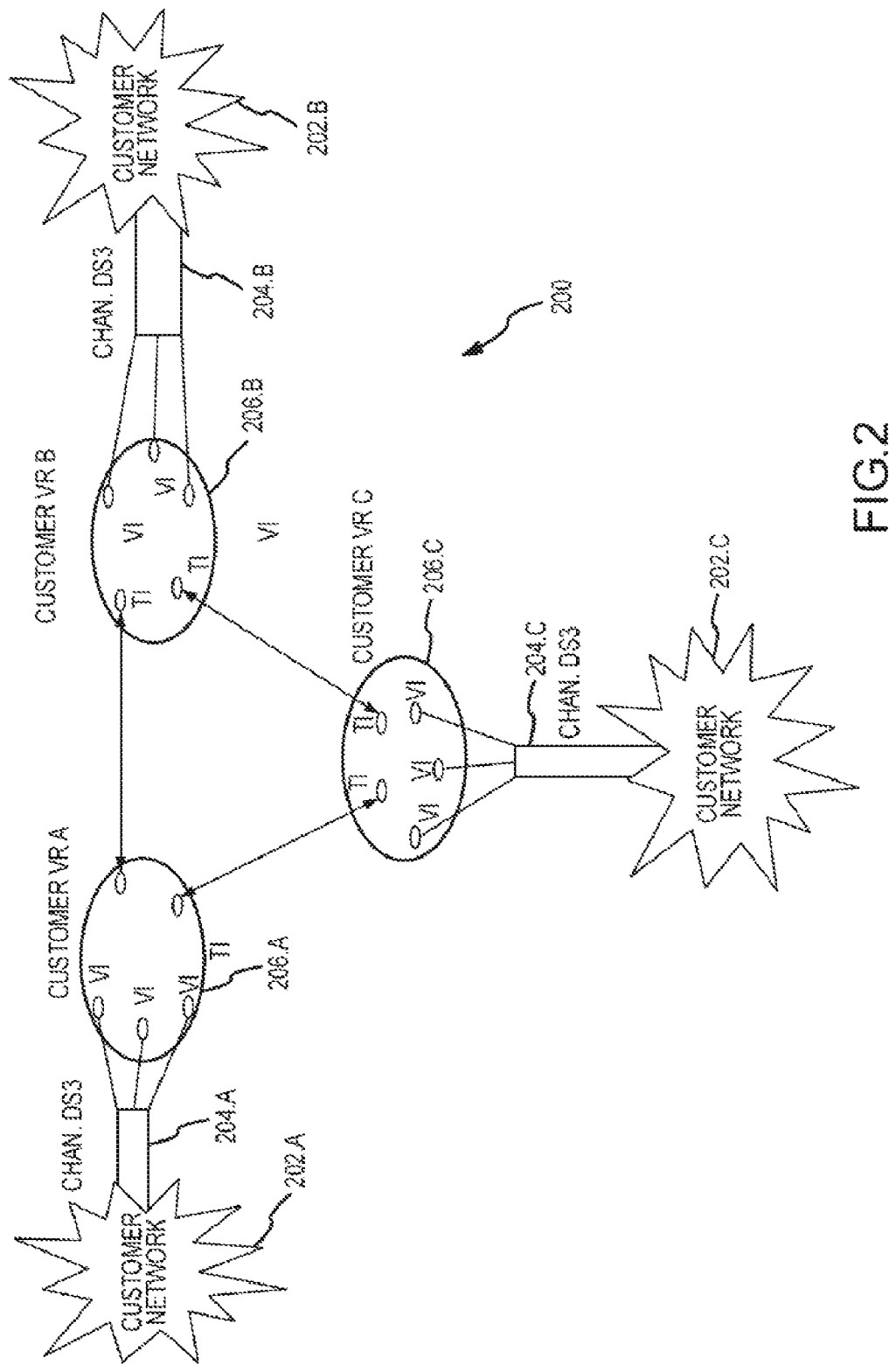
FIG. 2 is a diagram illustrating an exemplary Virtual Private Network (VPN), which may be used in discussing various embodiments of the present invention.

FIG. 2 provides an illustration of a VPN as used in various embodiments of the invention. A VPN is typically a logical grouping of virtual routers (VRs) 206. The connectivity between VPNs and customer sites 202 is provided by means of virtual interfaces (VIs). Users can create VIs and connect them to customer sites or to VIs of other VRs. The virtual connection can also be configured to be a tunnel interface (TI) to a type of secured tunnel, such as an IPSec tunnel. Customer sites can be connected via a network interface 204, which can be a leased line interface such as DS3. The invention is not limited to any particular type of network interface.

Figure 3:
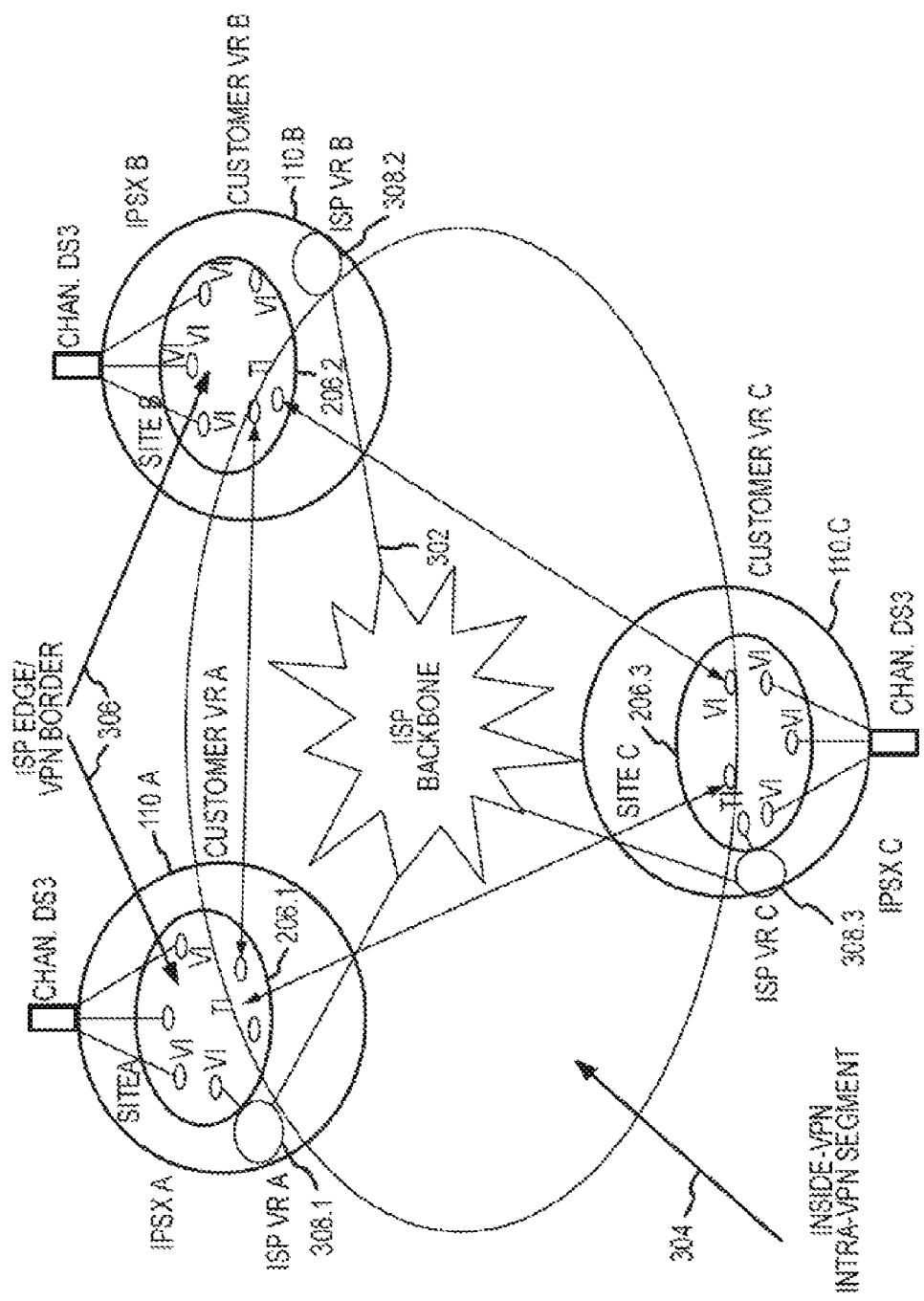
FIG. 3 is a diagram illustrating further details of an exemplary Virtual Private Network (VPN), which may be used in discussing various embodiments of the present invention.

In some embodiments of the invention, two types of virtual routers are supported: Customer VRs and ISP VRs. Customer VRs are used to build customer VPNs, and ISP VRs are used to build ISP VPN. The ISP VPN is connected to an ISP backbone network 310 (FIG. 3). In this framework, each ISP needs only one ISP VPN. Customer VRs can be connected to the ISP VPN by means of VIs. Every virtual router can use one or more routing protocols, including STATIC, RIP, OSPF, and BGP, to disseminate reachability information. For routing purposes, every VPN based on this framework can be treated as an extension of the customer network.

Various embodiments of the invention allow network managers to define profiles. The profile information may be used to automatically generate the routing configuration for a VPN. In some embodiments, to profile the routing on a VPN, a customer VPN is divided into three segments, which are illustrated in FIG. 3.

ISP-Edge segment 306 is a VPN segment that connects the VPN to customer sites. This segment includes all virtual interfaces connected to logical interfaces and tunnel interfaces whose remote end is outside the VPN. This segment is used for disseminating customer site reachability information.

Inside-VPN segment 304 (also referred to as an Intra-VPN segment) is a VPN segment that provides connectivity among different VRs 206. This segment is used to disseminate intra-VPN reachability information.

Inter-VPN segment 302 is a VPN segment that connects different types of VPNs; for example, the interfaces that connect a customer VPN with an ISP VPN.

It is desirable to identify segment types, because it provides a mechanism for generating profiles that can be optimized depending on the segment type.

Profile-Based Routing Configuration

Figure 4:
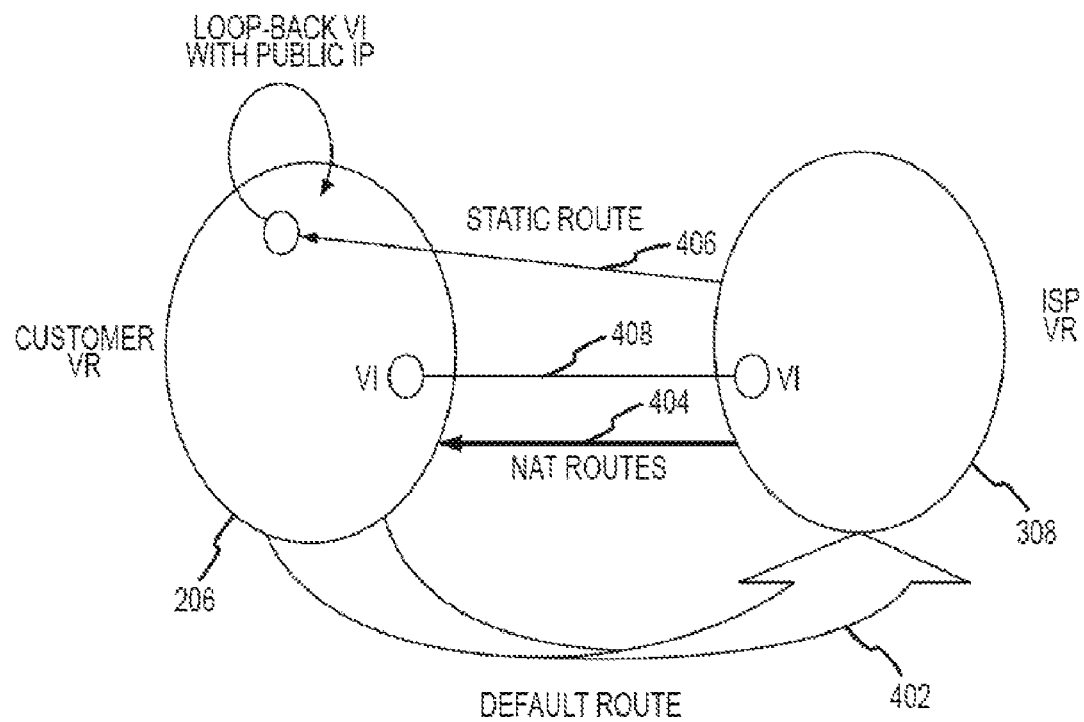
FIG. 4 is a diagram illustrating Inter-VPN reachability in accordance with various embodiments of the present invention.

FIG. 4 illustrates how the routing needs of the Inter-VPN segment 302 are taken care of at the time a VR is created. When a customer VR 206 is created, the user is given the option to automatically connect the VR with an ISP VR 308. At that time, service management system 118 (FIG. 1) also creates a default route 402 on the customer VR 206 and a static route 406 on the ISP VR 308, which accommodates customer VR 206 to ISP VR 308 connectivity. In this model, for all network address translation (NAT) addresses 404, the user must add static routes on the ISP VPN.

The profile discussed here takes care of the first two VPN segments: ISP-Edge 306 and Intra-VPN 304. Given a VPN's routing requirements, there are typically three routing aspects that are considered:

1) The routing protocol that should be turned on a virtual interface in a VR.
2) When and how to redistribute routes between various routing protocols.
3) When enabling a routing protocol on a router or interface, the routing parameters to use for optimizing performance.

Service management system 118 (FIG. 1) uses VPN profile data to automatically generate the required routing configuration. In some embodiments of the invention Border Gateway Protocol (BGP) is excluded as a possible choice for configuring customer VPNs. There are a few reasons for this. First, there are only two cases in which BGP would be used in a VPN environment. ISP-VPNs might use BGP to talk to the Internet core. Also, if a VPN connects two very large customer sites, IBGP might be needed for the Intra-VPN segment to ensure scalability. There will generally be very few ISP VPNs (in most networks, there is only one), and it's unlikely that a VPN will be used to connect two or more large sites.

The second reason for excluding BGP from the profile is the VR-specific customization that is required to make BGP work in a VPN environment. Because BGP connects ISP VRs to the ISP core, a careful selection of export and import policies is needed to minimize the number of routes in each ISP VR. It is very difficult to represent this type of configuration by means of a generic routing profile. Service management system 118 (FIG. 1) provides an interface to configure BGP on VRs. This interface allows user to enable BGP on a VR, set its BGP neighbors, and add import and export policies.

In some embodiments of the invention, the profile defines a simple routing configuration, that is, static routing for the Intra-VPN segment. Thus static routing will be used to communicate with each customer site. This configuration is desirable because it puts a minimum load on the device, thus increasing the number of VPNs that can be managed by each service processing switch 110.

There are two issues with static routing. First, ISPs need to manage static routes for each customer. As new subnets are added to customer networks and old ones are removed, the static routes corresponding to these subnets should be added or removed in the corresponding VPNs. In some embodiments, this problem can be solved by having service management system 118 (FIG. 1) take ownership of automatically managing static routes based on the customer site subnet information. In these cases, customers can directly add or remove subnet information using tools such as the customer network management system 106 (FIG. 1). This capability will transfer the ownership of managing routing to customers.

A second issue with static routing is that the routing by definition is STATIC. If a site interface is down, traffic cannot be re-routed to an alternate path. A partial solution to this problem can be provided by allowing customer to disable routing on a site that is down. This can be done by means of a customer network management system 106 (FIG. 1). In this scenario, service management system 118 (FIG. 1) would remove the static routes from the network that belong to the site that is down. This action would allow the traffic to go through the backup path.

Figure 5:
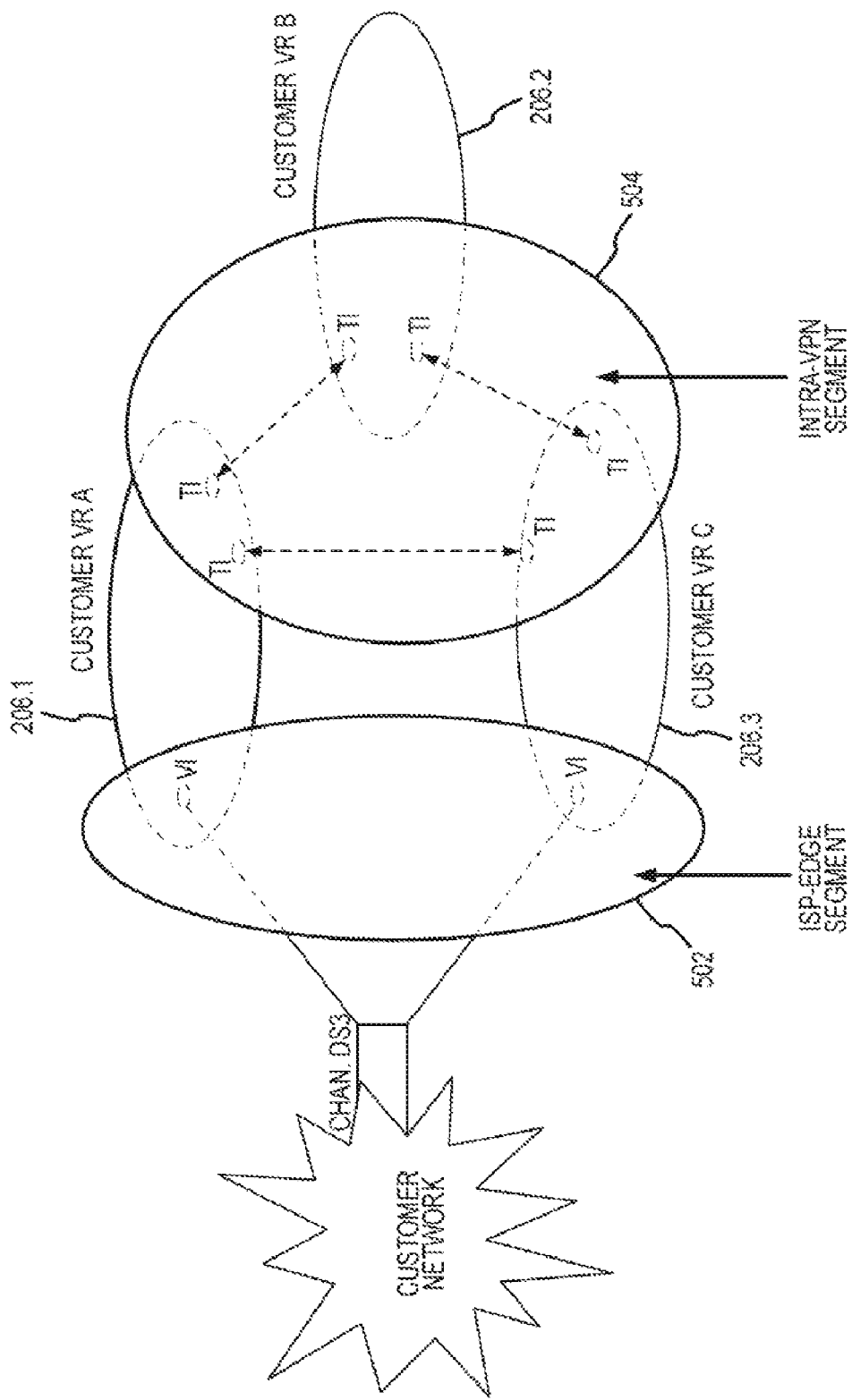
FIG. 5 is a diagram illustrating dynamic intra-VPN routing in accordance with various embodiments of the present invention.

To resolve the two issues described above, various embodiments of the present invention provide a mechanism for a user to choose more advanced routing options in profiles. For smaller sites, a viable option is Routing Information Protocol (RIP), while for large sites operators might choose Open Shortest Path First (OSPF) gateway protocol. Dynamic routing transfers the burden of managing route changes from the network manager to the device. If a user selects dynamic routing at the edge, then the service management system will also have to use dynamic routing to disseminate Intra-VPN reachability information. FIG. 5 illustrates this scenario. If a site link to virtual router A 206.1 is down, virtual router B 206.2 will know that the traffic going through that link needs to be rerouted to virtual router C 206.3 only if dynamic routing is specified for Intra-VPN segment 504.

If all the sites (ISP-Edge segment) are using static or RIP routing, service management system 118 will allow the user to choose between RIP and OSPF for Intra-VPN routing. The user will typically select RIP if there are relatively few VRs in the VPN. Because OSPF is more scalable, it is a logical choice for bigger VPNs. If a user decides to run OSPF at a site edge, it is desirable to select OSPF for the Intra-VPN segment.

This section has described the various software components in a system that provides for the automatic generation and provisioning of routing configurations. As those of skill in the art will appreciate, the software can be written in any of a number of programming languages known in the art, including but not limited to C/C++, Java, Visual Basic, Smalltalk, Pascal, Ada and similar programming languages. The invention is not limited to any particular programming language for implementation.

Methods for Performing Profile-Based Routing Configuration

Figure 6:
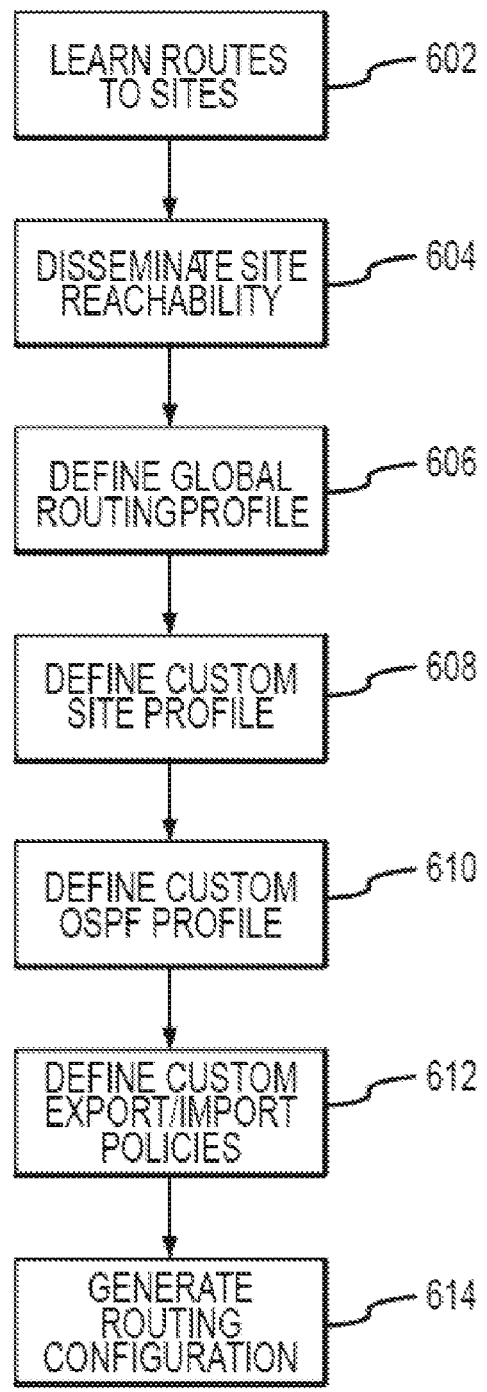
FIG. 6 is a flowchart illustrating a method for provisioning a router configuration according to an embodiment of the present invention.

In the previous section, a system level overviews of the operation of exemplary embodiments of the invention were described. In this section, the particular methods of the invention performed by an operating environment executing an exemplary embodiment are described by reference to a flowchart shown in FIG. 6. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 6 is inclusive of the acts required to be taken by an operating environment executing an exemplary embodiment of the invention.

The method begins at block 602 when a system executing the method learns, or discovers, the current routes to sites connected via the service processing switch 110 (FIG. 1). To build or include new sites in a VPN, each edge router must learn the routes to all sites connected to all the edges in the network. An edge in a network is a boundary between two routers, an edge router is a typically network device that routes data between one or more local area networks backbone network. Two components of routing information are typically needed for the VPN:

1) Site Reachability Information: Each edge router needs to learn the set of VPN addresses and address prefixes reachable at each site. The reachability information needed by the Customer Provided Equipment (CPE) router depends on site configuration. Customer sites are characterized into two categories: stub sites and non-stub sites. The CPE routers of stub sites have default routes pointing to an ISP edge router, while the CPE router of non-stub site do not, and therefor need to know the set of non-local destinations reachable via that link. Usually, if a VPN also provides Internet connectivity to a site and there is no backdoor connection between this and any other site, it is a stub site.

2) Intra-VPN Reachability Information: Once an edge router has learned the set of prefixes associated with each of its customer site's links, this information must be disseminated to each other router in the VPN.

After learning routes to sites, the system disseminates site reachability information (block 604). Various embodiments of the invention employ different mechanisms to disseminate the information. In one embodiment, static configuration is used. In static configuration, all the subnets associated with each customer site are manually configured into the VPN. To increase the manageability of this information, customer network management (CNM) 116 (FIG. 1) tools can be enhanced to allow customers to directly add and remove subnet information from the VPN. The subnet information can be used to automatically create the static routes in the VPN. In this case, the customer also needs to add static routes to the CPE routers of non-stub sites.

In an alternative embodiment, directory lookup is used to disseminate the site routing information. A central directory server can maintain the identities of edge routers associated with a VPN, and the set of customer site links bound to the VPN per edge router. Each edge router can query this information using some defined mechanism (for example, LDAP) upon startup. This mechanism requires some kind of database synchronization mechanism in order for all edge routers to learn the addition and deletion of sites from the VPN.

In a further alternative embodiment, a routing protocol can be run between the CPE edge router and the ISP edge router to exchange reachability information. This allows an ISP edge router to learn the prefixes that can be reached at a customer site, and enables a CPE router to learn the destinations that can be reached via the provider network.

In a still further embodiment, if a CPE router runs Multi-protocol Label Switching (MPLS), the MPLS Label Distribution Protocol (LDP) can be extended to convey the set of prefixes at each stub site, together with the appropriate labeling information.

In addition to the above, several mechanisms for Disseminating Intra-VPN Reachability Information can be used. In one embodiment employing static configuration, the service management system 118 can use the subnets configured for each site to automatically create static routes for dissemination of intra-VPN reachability information.

In an alternative embodiment, directory lookup information is used. In addition to VPN membership information, a central directory can maintain a listing of the address prefixes associated with each end point.

In a further alternative embodiment, each edge router runs an instance of a routing protocol on each VPN to disseminate intra-VPN reachability information. Using this mechanism, both full-mesh and arbitrary, VPN topologies can be easily supported.

A still further alternative embodiment uses a Link Reachability Protocol. Here each edge router can run a link reachability protocol carrying the necessary information. This protocol runs across the tunnel between the two edge routers. The two preferred choices for this approach are a variation of MPLS LDP and IBGP. The link reachability protocol-based schemes can support only fully meshed VPNs.

In yet a further alternative embodiment, site reachability information is disseminated by Piggybacking on IP Backbone Routing Protocols. The set of address prefixes associated with each stub interface can also be piggybacked into the routing advertisements from each edge router and propagated through the network. Other edge routers extract this information from received route advertisements. This scheme typically requires that intermediate routers cache intra-VPN routing information to propagate the data further. This also has implications for the level of security possible for intra-VPN routing information.

In addition to learning and disseminating site reachability information, a global routing profile can be defined (block 606). In one embodiment of the invention, the global routing profile includes the following parameters:
   a. Routing administration status
   b. Routing protocol for Intra-VPN segments
   c. Default routing protocol at the ISP edge. All the customer sites will generally inherit this.
   d. Default site type: stub or non-stub: Stub sites have a default route going toward the ISP VPN (Internet). For stub sites, there is no need to export routes from the VPN. This information is used in creating default export and import policies.
   e. If the routing protocol for the Intra-VPN segment is OSPF, define the OSPF profile topology type.

When a site is added, it inherits the routing configuration from the routing profile.

In addition, the system provides for the definition of a custom site profile (block 608). Multiple types of site information can be configured. First, if the site routing profile needs to be customized, the user may do so. Second, if a user wants static routing at the edge, the network subnets that are associated with the site must be provided. This configuration will allow the service management system to automatically create static routes. In one embodiment of the invention, the site profile contains following parameters:

a. Routing Protocol at the ISP edge
b. Site Type: stub or non-stub
c. OSPF Area ID: If OSPF is enabled at the edge
d. Site subnets.

In addition, a custom OSPF profile can be defined (block 610). When a user configures a routing profile, service management system 118 (FIG. 1) automatically generates OSPF, RIP, and static profiles, if needed. In many cases, the user will want to customize the generic OSPF profile. The user can customize the generated profile using a policy-based profile configuration workflow. The workflow includes the following features:

1) The user can define custom OSPF areas. He only needs to configure what VRs are included in what areas; Service management system 118 (FIG. 1) generates the required configuration for each VR and VI.
2) The user can define a route aggregation policy for an OSPF area; Service management system 118 (FIG. 1) will auto-generate this configuration for all the VRs in that area.
3) By default, Service management system 118 (FIG. 1) generates one VR routing parameter policy, which applies to all VRs, and three VI routing parameter policies, which apply to tunnel interfaces, customer site edges, and VI-VI connections. When routing configuration is generated, these policies are used to define routing parameters. The user can make changes in any of these policies, or create his own policies and assign them as defaults. The user also can define policies and set them to be applied on a set of VRs or VIs. Service management system 118 (FIG. 1) allows users to individually customize parameters for a VR or VI.

When configuring OSPF for intra-VPN segment, the service management system cannot use the same guidelines as those used in setting up a normal OSPF network, because each router in a VPN is a virtual router. To optimize performance, it is desirable to minimize the size of the routing table. This can be accomplished by keeping the OSPF areas small. In a normal OSPF network, the network manager would not let the size of an OSPF area grow beyond 50-60 routers. With a VPN, it is desirable to not let the OSPF area grow beyond 20-25 VRs. The larger the OSPF area, the higher the load on each VR, and hence the fewer the VRs that can be created on the service processing switch. As a result, it is not desirable to make a complete mesh of all the VRs in a large VPN. The user should use a custom OSPF topology and create areas of reasonable size to ensure scalability and stability of the OSPF network.

The system also provides for the definition of custom export/import policies (block 612). Using the router and site profile defined above, service management system 118 (FIG. 1) generates default policies necessary for different routing protocols to talk to each other. In some situations, custom export and import policies are needed to control access to critical networks. The system allows users to add custom export and import policies.

Based on the site reachability information and/or the global and custom profiles described above, the service management system generates routing configuration (block 614). Described below are exemplary items that may be considered during the generation of the configuration:

The user can only configure one protocol for the Intra-VPN segment. This configuration is used to configure the routing on all the interfaces that connect one VR to another in the same VPN. In most cases, this takes care of all tunnel interfaces.

If the user selects static routing for a site, service management system 118 (FIG. 1) will auto-generate one static route per site subnet on the local VR. If the routing for the Intra-VPN segment is also static, service management system 118 (FIG. 1) will also generate one static route per subnet on each remote VR. Auto-generation of static routes assumes a meshed-topology for the VPN. If the topology is not meshed, some additional configuration may be needed for the routing to work.

If dynamic routing is selected for the Intra-VPN segment, service management system 118 (FIG. 1) auto-generates export policies to disseminate site reachability information to other VRs.

For a non-stub site that is using dynamic routing to communicate with the VPN, service management system 118 (FIG. 1) will create an export policy to inject all the routes learned from the Intra-VPN segment's routing into the customer network.

If the user selects a custom OSPF topology for the Intra-VPN segment, he does not have to explicitly assign an area ID for each interface. Service management system 118 (FIG. 1) automatically interprets this information from the area configuration.

Once the profile is set, Service management system 118 (FIG. 1) automatically handles the routing configuration for the addition and deletion of VRs and VIs. For example, if standard OSPF routing has been selected for the Intra-VPN segment, whenever the user creates an IPSec tunnel connecting two VRs, OSPF will be enabled with area ID 0.0.0.0.

If a VPN is using only one routing protocol for the Intra-VPN segment, service management system 118 (FIG. 1) can discover routing profiles from the device configuration.

Service management system 118 (FIG. 1) supports explicit two-phase provisioning of routing profile configurations. In the first phase, the user makes changes to the routing profile and saves them in the database. In the second phase, the user commits the profile to the network. In this phase, the server translates delta changes in the profile configuration into a required low-level configuration and pushes it to appropriate devices.

Service management system 118 (FIG. 1) allows users to temporarily remove routing configurations from the device. Users can do this by providing administration status attributes for the routing profile. Setting this attribute to a "disabled" state and committing the profile removes configurations from the device. Routing can be turned on again by setting the admin status to "enabled."

As can be seen from the above, the generated and customized policies can act as templates that can be applied to particular VPNs, particular VRs, or groups of VRs. For example, assume an existing policy has been changed or further customized. In one embodiment of the invention, the user is presented with a list of VRs or VPNs that were configured with the existing policy. The user can then select the VRs to which the new policy should be applied.

Similarly, assume that the user wishes to change the policy for a particular VR. In one embodiment of the invention, the user selects the desired VR, and then selects a new policy to be applied to the VR. The new policy can then be applied immediately, or it can be applied at a later scheduled time.

In addition, the policies can be used as a differentiator in providing VPN services. If user selects STATIC routing for ISP-Edge and Intra-VPN segments, the service processing switch does not need to run any routing instances per customer VR. On the other hand, if a user has chosen to run dynamic routing for Intra-VPN and ISP edge segments, the switch may have to run instances of routing protocols such as OSPF and RIP. Running routing instances on virtual routers consumes both processing power and memory on the processing elements and blades. The demand on the resources will depend on the size of VPN and its interaction with various customer sites. An ISP can recover the cost of the increased resource usage, by using routing as a differentiator in providing VPN services. There are few methods of providing services:

1) Allow user to select the routing protocol per site: STATIC, RIP, or OSPF. Based on the site configuration, ISP can automatically configure routing protocol for intra-VPN segment. The cost of the service should be the lowest for STATIC and the highest for OSPF.

2) Define a few fixed routing profiles and sell them as a part of service packages such as Gold, Silver, and Bronze. For instance, Gold will allow user to select OSPF for intra-VPN as well as ISP edge segment. Silver will allow user to configure OSPF for intra-VPN segment, while RIP for ISPF edge. The bronze package will permit customer to configure STATIC for ISP edge as well as Intra-VPN segment.

3) Provide additional services as part of a profile, For example, include firewall, intrusion detection, network address translation, proxy services, or other network services as part of a differentiated service package. The service can then be included in profiles defined as part of the service package, and excluded from profiles for customers that do not pay for the service.

Conclusion

Systems and methods for generating and provisioning router configurations are disclosed. Embodiments of the present invention provide advantages over previous systems. For example, embodiments of the present invention provide a mechanism for easily and rapidly generating configuration information for large numbers of virtual routers and virtual private networks based on profiles. In addition, embodiments of the present invention separate the connectivity and routing needs of each VPN, thus significantly reducing the complexity of the network design. This separation also enables layering of advanced services to specific subscribers' networks. Visibility of subscriber services is end-to-end. The topology and routing needs of each VPN depend on the number and size of customer sites.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method of simplifying the provisioning and management of network-based virtual private networks (VPNs), the method comprising:

generating, by a service management system (SMS), a routing configuration for each of a plurality of network-based customer virtual private networks (VPNs) for a plurality of customers based on (i) site reachability information for a plurality of service processing switches and (ii) a global customer routing profile for a network-based customer VPN of the plurality of network-based customer VPNs;

provisioning, by the SMS, a plurality of virtual routers (VRs) distributed among the plurality of service processing switches to support the plurality of network-based customer VPNs based on the routing configurations;

receiving, at the SMS, a custom routing profile for the network-based customer VPN, the custom routing profile identifying one or more routing protocols to be used for one or more segments of the network-based customer VPN; and automatically reconfiguring, by the SMS, the network-based customer VPN by programmatically generating appropriate routing configurations for VRs of the plurality of VRs partitioned to the network-based customer VPN based on the site reachability information and the custom routing profile.

2. The method of claim 1, wherein the custom routing profile is based upon the global customer routing profile.

3. The method of claim 1, further comprising disseminating portions of the site reachability information to routers associated with the plurality of network-based customer VPNs.

4. The method of claim 3, wherein said disseminating portions of the site reachability information comprises reading subnets for sites of the plurality of customers and creating static routes for the subnets.

5. The method of claim 3, wherein said disseminating portions of the site reachability information comprises placing the portions of site reachability information in one or more directories and providing access to the one or more directories via Lightweight Directory Access Protocol (LDAP).

6. The method of claim 3, wherein said disseminating portions of the site reachability information comprises use of a static configuration in which the subnets are manually configured into the plurality of network-based customer VPNs.

7. The method of claim 3, wherein said disseminating portions of the site reachability information comprises exchanging the portions via one or more routing protocols.

8. The method of claim 3, wherein said disseminating portions of the site reachability information comprises conveying the portions via Multiprotocol Label Switching Label Distribution Protocol (MPLS LDP).

9. The method of claim 3, wherein the custom routing profile comprises an Open Shortest Path First (OSPF) profile and wherein the OSPF profile includes a route aggregation policy.

10. The method of claim 3, wherein the custom routing profile includes parameters relating to one or more of Internet Protocol Security (IPSec), LT2P, Point-to-Point Tunneling Protocol (PPTP), Generic Route Encapsulation (GRE) protocol and Multiprotocol Label Switching (MPLS).

11. A non-transitory program storage device readable by a service management system (SMS) of a service provider, tangibly embodying a program of instructions executable by one or more computer processors of the SMS to perform method steps for simplifying the provisioning and management of network-based virtual private networks (VPNs), said method steps comprising:

generating a routing configuration for each of a plurality of network-based customer virtual private networks (VPNs) for a plurality of customers based on (i) site reachability information for a plurality of service processing switches and (ii) a global customer routing profile for a network-based customer VPN of the plurality of network-based customer VPNs;

provisioning a plurality of virtual routers (VRs) distributed among the plurality of service processing switches to support the plurality of network-based customer VPNs based on the routing configurations;

receiving a custom routing profile for the network-based customer VPN, the custom routing profile identifying one or more routing protocols to be used for one or more segments of the network-based customer VPN; and automatically reconfiguring the network-based customer VPN by programmatically generating appropriate routing configurations for VRs of the plurality of VRs partitioned to the network-based customer VPN based on the site reachability information and the custom routing profile.

12. The program storage device of claim 11, wherein the custom routing profile is based upon the global customer routing profile.

13. The program storage device of claim 11, the method further comprising disseminating portions of the site reachability information to routers associated with the plurality of network-based customer VPNs.

14. The program storage device of claim 13, wherein said disseminating portions of the site reachability information comprises reading subnets for sites of the plurality of customers and creating static routes for the subnets.

15. The program storage device of claim 13, wherein said disseminating portions of the site reachability information comprises placing the portions of site reachability information in one or more directories and providing access to the one or more directories via Lightweight Directory Access Protocol (LDAP).

16. The program storage device of claim 13, wherein said disseminating portions of the site reachability information comprises use of a static configuration in which the subnets are manually configured into the plurality of network-based customer VPNs.

17. The program storage device of claim 13, wherein said disseminating portions of the site reachability information comprises exchanging the portions via one or more routing protocols.

18. The program storage device of claim 13, wherein said disseminating portions of the site reachability information comprises conveying the portions via Multiprotocol Label Switching Label Distribution Protocol (MPLS LDP).

19. The program storage device of claim 3, wherein the custom routing profile comprises an Open Shortest Path First (OSPF) profile and wherein the OSPF profile includes a route aggregation policy.

20. The program storage device of claim 13, wherein the custom routing profile includes parameters relating to one or more of Internet Protocol Security (IPSec), LT2P, Point-to-Point Tunneling Protocol (PPTP), Generic Route Encapsulation (GRE) protocol and Multiprotocol Label Switching (MPLS).

21. A service management system (SMS) comprising:
a non-transitory storage device having stored therein a program of instructions configured to provision and manage a plurality of network-based virtual private networks (VPNs); and one or more processors coupled to the non-transitory storage device configured to execute the program of instructions to (i) provision a plurality of virtual routers (VRs) distributed among a plurality of service processing switches to support the plurality of network-based VPNs and (ii) automatically reconfigure a network-based VPN of the plurality of network-based VPNs, responsive to receipt of a custom routing profile for the network-based VPN, where:

the plurality of VRs are provisioned by generating a routing configuration for each of the plurality of network-based VPNs for a plurality of customers based on (i) site reachability information for the plurality of service processing switches and (ii) a global customer routing profile for a network-based VPN of the plurality of network-based VPNs; and the custom routing profile identifies one or more routing protocols to be used for one or more segments of the network-based VPN.

22. The SMS of claim 21, wherein the custom routing profile is based upon the global customer routing profile.

23. The SMS of claim 21, wherein portions of the site reachability information are disseminated to routers associated with the plurality of network-based VPNs.

24. The SMS of claim 23, wherein said subnets for sites of the plurality of customers are read and static routes for the subnets are created.

25. The SMS of claim 23, wherein the portions of site reachability information are placed in one or more directories and access to the one or more directories is provided via Lightweight Directory Access Protocol (LDAP).

26. The SMS of claim 23, wherein a static configuration is used in which the subnets are manually configured into the plurality of network-based customer VPNs.

27. The SMS of claim 23, wherein the portions are exchanged via one or more routing protocols.

28. The method of claim 23, wherein the portions are conveyed via Multiprotocol Label Switching Label Distribution Protocol (MPLS LDP).

29. The method of claim 23, wherein the custom routing profile comprises an Open Shortest Path First (OSPF) profile including a route aggregation policy.

30. The method of claim 23, wherein the custom routing profile includes parameters relating to one or more of Internet Protocol Security (IPSec), LT2P, Point-to-Point Tunneling Protocol (PPTP), Generic Route Encapsulation (GRE) protocol and Multiprotocol Label Switching (MPLS).

* * * * *